Dec. 8, 1925.  
W. H. BERNTSEN  
WATER FILTERING DEVICE  
Filed June 4, 1925  
1,565,233  
2 Sheets-Sheet 1
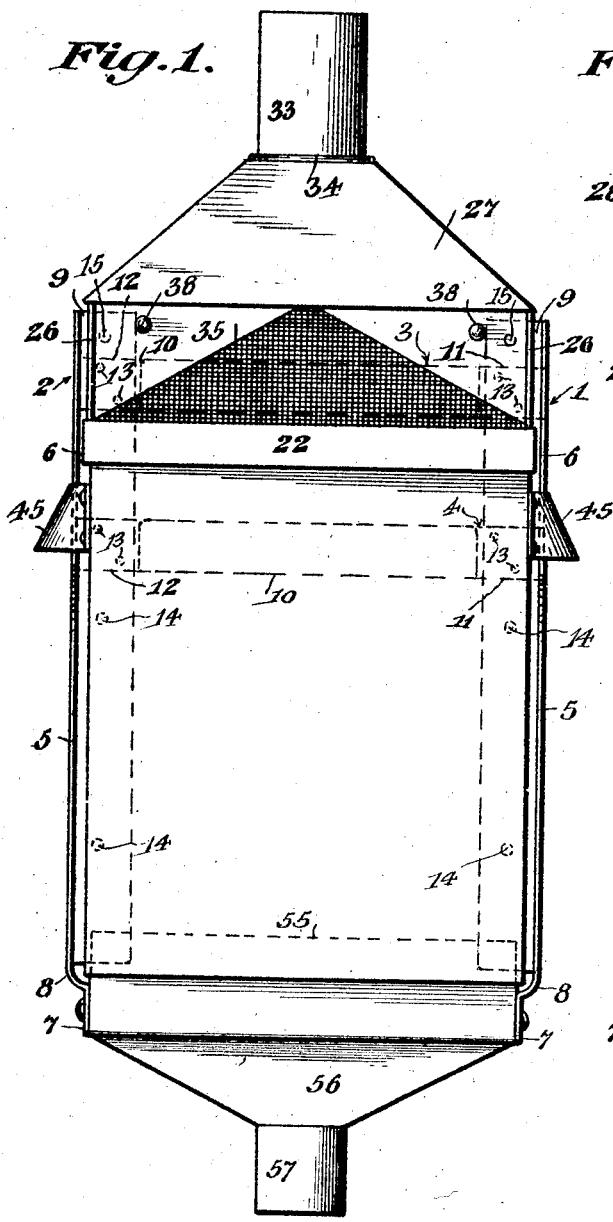
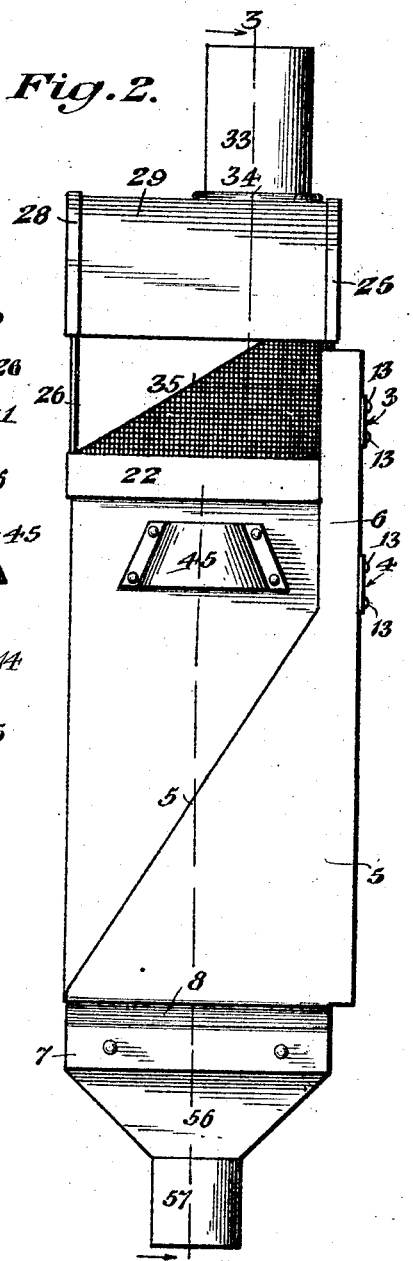
INVENTOR.  
William H. Berntsen,  
BY  
Geo. P. Kimmel, ATTORNEY.

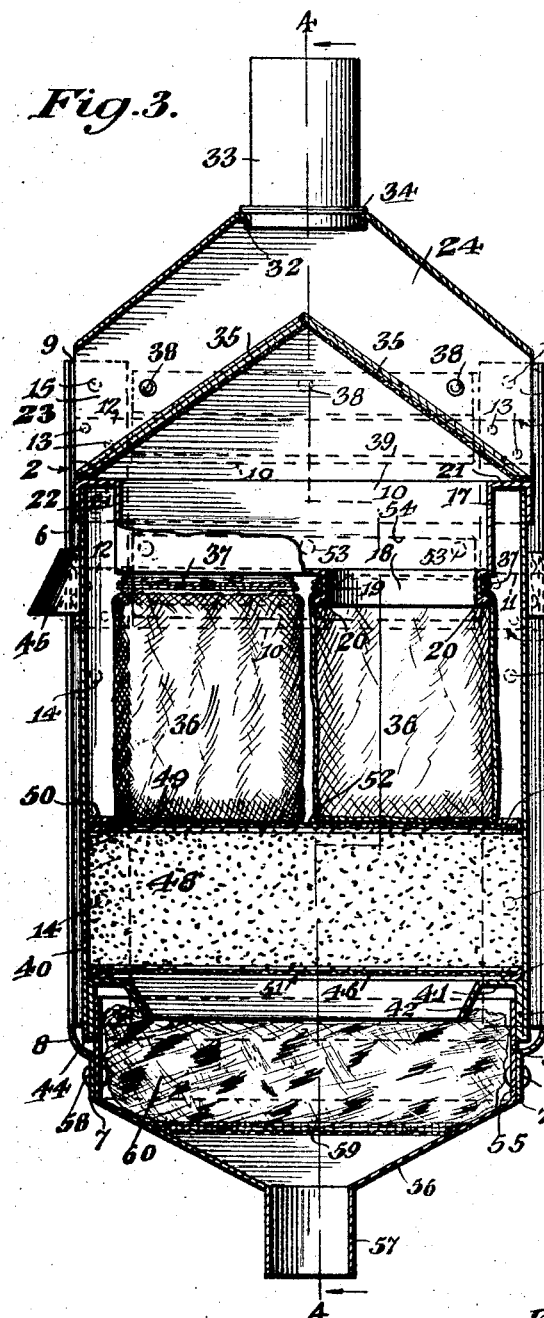

Patented Dec. 8, 1925.

1,565,233

UNITED STATES PATENT OFFICE.

WILLIAM H. BERNTSEN, OF AUGUSTA, KANSAS.

WATER-FILTERING DEVICE.

Application filed June 4, 1925. Serial No. 34,957.

*To all whom it may concern:*

Be it known that I, WILLIAM H. BERNTSEN, a citizen of the United States, residing at Augusta, in the county of Butler and State of Kansas, have invented certain new and useful Improvements in Water-Filtering Devices, of which the following is a specification.

This invention relates to a water filtering device, designed primarily for use in connection with a cistern, but it is to be understood that a filter, in accordance with this invention, can be employed for any purposes for which it is found applicable, and the invention has for its object to provide, in a manner as hereinafter set forth, a device of the class referred to, with means to require, at all times, the straining of the water prior to its passage through a filtering medium, and further with means whereby the device will perform its filtering function satisfactorily at all times, under the conditions respectively of a slow rain, hard rain or a cloud burst.

A further object of the invention is to provide, in a manner as hereinafter set forth, a filtering device, provided with means for throwing off surplus water when the supply of water exceeds the straining and filtering capacity of the device.

A further object of the invention is to provide, in a manner as hereinafter set forth, a filtering device with a filter head and with the latter so constructed whereby if the strainer elements of the device become clogged, the water will be deflected from the device through the filter head.

A further object of the invention is to provide, in a manner as hereinafter set forth, a filtering device formed of a series of detachable elements capable of being readily disassembled and cleaned when occasion requires.

A further object of the invention is to provide, in a manner as hereinafter set forth, a filtering device provided with a plurality of strainer elements and further with a filtering medium, and with the strainer elements, during the operation of the device, acting as means to maintain the filtering medium in position.

A further object of the invention is to provide, in a manner as hereinafter set forth, a filtering device, formed of a series of detachable sections and a stationary support therefor constituting means for removably securing, as well as supporting the elements of the device in operative position with respect to each other.

A further object of the invention is to provide, in a manner as hereinafter set forth, a filtering device, with means to prevent any possibility of foreign matter being carried by the water into the collector or cistern with which the device is associated.

Further objects of the invention are to provide, in a manner as hereinafter set forth, a filtering device which is simple in its construction and arrangement, strong, durable, readily assembled and disassembled when occasion so requires, thoroughly efficient in its use, and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a front elevation of a filtering device, in accordance with this invention.

Figure 2 is a side elevation thereof.

Figure 3 is a section on line 3—3, Figure 2.

Figure 4 is a section on line 4—4, Figure 3.

A filtering device, in accordance with this invention, comprises a support, a head, a combined strainer and filtering medium carrier, and a base. The support has secured to its lower end the base, and further has means intermediate its ends for detachably connecting the head and carrier therewith. The support can be anchored in position and when so positioned the head and carrier can be arranged in operative relation with respect to each other within the support, as well as detachably connected to the latter to permit of the head and carrier to be removed when occasion requires and also so that access can be had to the base.

The support consists of a pair of vertically extending, opposed side members, referred to generally by the reference characters 1, 2 and a pair of superposed spaced combined brace and coupling members referred to generally by the reference characters 3, 4. The side members 1, 2 are oppositely disposed with respect to each other and as these members are of the same construction, but one will be described, as the description of one will apply to the other.

Each side member comprises a triangular-shaped intermediate portion 5, a narrow upper portion 6 and an inset lower portion 7, which is of a length less than the width of the base of the intermediate portion 5. The lower portion 7 is flush with the forward edge of the base of the intermediate portion 5 and terminates at a point removed from the rear of the base of the intermediate portion 5. The lower end of the portion 5 curves inwardly, as at 8, and merges in the top of the portion 7. The said portion 7 is vertically disposed and extends in a plane parallel to the plane of the portions 5, 6. The portion 6 has its rear flush with the rear of the portion 5 and is of a width materially less than a quarter of the width of the base of the portion 5. The rear of the portions 5 and 6 terminates in an inwardly extending right angularly disposed flange 9, which extends through the length of said portions 5, 6, and is of greater width than the width of the portion 6.

The combined brace and coupling members 3, 4 are of the same construction, and the description of one will apply to the other. Each of said members consists of a vertically disposed intermediate U-shaped portion 10 and a pair of end portions 11 and 12. The end portions 11 and 12 project from the rear wall of the U-shaped portion 10. The end portions 11 and 12 are secured to the rear of the flanges 9 by hold-fast devices 13. The U-shaped intermediate portion 10 is arranged between the flanges 9 and the forward wall of said U-shaped portion projects forwardly with respect to the forward face of the flanges 9. See Figure 4. The members 3 and 4 are arranged one at a point removed from the upper end of the portion 6, and the other at the lower end of the portion 6. The members 3 and 4 not only provide means for connecting together the members 1, 2, but further maintain said members in spaced relation, and further constitute means for detachably connecting the head and carrier to and within the support. The flanges 9 are formed throughout with openings 14 for the passage of hold-fast devices 15 for anchoring the support 15 to a wall 16 or other support.

The head consists of a rectangular pan 17 having its bottom provided with a pair of spaced openings 18 and with a pair of depending collars 19 each formed with a laterally extending annular flange 20. The collars 19 form continuations of the walls of the openings 18. The top of the pan 17 is formed throughout with an outwardly extending right angularly disposed ledge 21 provided throughout with a vertically disposed depending flange 22.

Projecting upwardly from the rear of the ledge 21, as well as being secured thereto, is a vertically disposed back plate formed of a rectangular lower portion 23 and an upper portion 24 having each side thereof extending upon an upward and inward inclination and terminating at a point adjacent the vertical median of said upper portion 24, thereby providing the top of the portion 24 flat. The portion 24 is provided throughout, at the edge thereof, with a forwardly extending flange 25.

Secured to each forward corner of the ledge 21 is a vertically disposed post 26 of the same height as the height of the portion 23 of the back plate, and secured to the upper ends of the posts 26 is a front plate 27 of the same shape as the portion 24 of the back plate, and said front plate 27 is provided at its sides and top throughout with a rearwardly extending flange 28. Positioned between the plate 27 and portion 23 of the back plate is a cover member 29 of the same contour as the contour of the front plate 27. The flanges 25 and 28 overlap the cover plate 29 and are suitably connected therewith. As the cover plate 29 is of the same contour as the front plate 27 and portion 24 of the back plate, it is formed at its top with a flattened portion 30, and between the transverse center and rear end of the portion 30 it is formed with an opening 31 and a depending collar 32 which forms a continuation of the wall of the opening 31. Mounted in the opening 31 is a vertically disposed inlet spout 33 formed with a flange 34, which seats on the portion 30. The spout 33 extends into the collar 32 and is secured to the portion 30 and to said collar. The spout 33 communicates with a source of water supply.

Secured to the portions 23 and 24 of the back plate and also to the sides and front of the ledge 21 is a pyramidal shaped foraminous element 35 which constitutes a strainer. The element 35 is so constructed that it will extend at a downward inclination towards the sides and front of the ledge 21.

Detachably secured to each of the collars 19 is a bag 36 formed of porous flexible material and each of which provides a strainer element. The bags are of the desired height and the height of one corresponds to the height of the other. Each bag is removably secured to a collar 19 by a flexible tie member 37, which surrounds the upper end of the bag and is interposed between the flange 20 and bottom of the pan 17.

The material from which the bags are constructed can be of any weave desired and which is determined by the amount of water that is to be filtered, or in other words, the bags can be of loosely woven or tightly woven material.

Secured to the rear of the portion 23 of the back plate by hold-fast devices 38, is an offset connecting strip 39 adapted to engage in the U-shaped intermediate portion of the member 3 for the purpose of detachably connecting the head to the support.

The carrier consists of a hollow rectangular casing 40, open at its top and provided therein, near its bottom, with a rectangular ledge 41 terminating in a rectangular funnel-shaped conductor 42. As shown, the ledge 41 and conductor 42 are provided by bending inwardly a part of the material from which the casing 40 is constructed. The material is bent inwardly to engage the inner face of the body, as at 43, then at right angles with respect to the inner face of the casing to form the ledge 41, and then downwardly at an inward inclination. The bent portion of the material is suitably secured in position. The conductor 42 has its lower end positioned above the bottom edge 44 of the casing 40. Extended laterally from each side of the casing 40, as well as being secured therewith, is a handle 45 and which project beyond the side members of the support, see Figure 3, and provides means for conveniently positioning the carrier or removing the same when desired.

Mounted on the ledge 41 is a strainer element consisting of a rectangular sheet 46 of foraminous material secured in a rectangular frame 47, which snugly engages throughout the inner face of the casing 40. Mounted on the said strainer element is a filtering medium 48 consisting of a body of charcoal, and mounted on said filtering medium is a strainer element consisting of a rectangular sheet 49 of foraminous material secured in a rectangular frame 50, which snugly fits the inner face of the casing 40 throughout. That strainer element mounted on the ledge 41 is referred to generally by the reference character 51, and that strainer element mounted on the body of charcoal 48 is generally referred to by the reference character 52, and the latter is engaged by the strainer elements formed by the bags 36, and these latter when the device is operated, act to maintain the strainer elements 52 against the body of charcoal 48.

The casing 40 has secured to the rear wall thereof, by the hold-fast devices 53, an offset connecting member 54 adapted to engage in the intermediate portion of the member 4 for the purpose of detachably connecting the carrier to the support, and further for maintaining the carrier in operative relation with respect to the head. When the carrier is mounted in position it abuts against the bottom of the pan 17 and engages the inner face throughout of the flange 22, which depends from the ledge 21.

The base comprises a rectangular pan 55, having a hopper shaped bottom 56 provided with a discharge spout 57, which opens into a collector, such as a cistern. The sides of the pan 55 are fixedly secured by the hold-fast devices 58 to the lower parts of the portions 7 of the side members of the support, whereby the base will be fixedly secured to the support. The pan 55 has its upper portion spaced from the intermediate portions 5 of the side members of the support, see Figure 3, and when the pan is arranged in operative relation with respect to said carrier, the upper end of the pan extends into the casing 40 and engages throughout the up-turned portion 43 of the casing 40. The pan when in position has its top edge terminate at a point removed from the ledge 41, and into the top of the pan 55 extends the conductor 42. Secured in the bottom 56, of the pan 55, and spaced from the spout 57 is a rectangular sheet 59 of foraminous material which constitutes a strainer element, and mounted on the latter is an absorbent porous body 60 in the form of a sponge and which is larger than the conductor 42. When the base is mounted in operative position with respect to the carrier, the conductor 42 extends into the top of the sponge 60. The sponge 60 is provided to collect any small particles of charcoal that have become dislodged in the carrier, if such particles should pass through the strainer 51.

The pan 17, together with its ledge and flange, acts as a closure for the top of the carrier so that unless the water is conducted through the strainer elements 36, it cannot be passed to the filtering medium, therefore, if the strainer elements 36 should become clogged, the water would pass off through the head of the device. The arrangement of the strainer elements 36 is such that no unstrained water can pass to the filtering medium 48, therefore, it is obvious that on the supply of water through the spout 33 it will be impossible for water with any foreign substances to pass to the collector or cistern, or in other words, the water when supplied must first pass through the strainer elements 35, which will deflect any large foreign bodies, then after passage through the strainer elements 35, the water is compelled to pass through the strainer elements 36, which catch up any small foreign bodies which pass through the strainer element 35. After the water passes through the strainer elements 36, it passes through the strainer element 52, then is filtered by the charcoal 48, then passes through the strainer 51, sponge 60, strainer 59 and then into the cistern or collector.

The device includes a removable head to which is attached the first strainer element for removal of coarse foreign bodies, and further includes cloth strainer elements with elongated filtration surfaces. The head is so constructed and arranged that if the cloth strainers clog or fail to function, the impure water overflows on the outside and does not pass on into the collector or cistern. Further, the cloth strainers are so constructed and arranged that they rest on a removable strainer element which is mounted on the body of charcoal and said cloth strainers act to hold the body of charcoal in position, due to the weight of the cloth strainers on the removable straining element which is mounted on the top of the body of charcoal. Then further, as the cloth strainers are arranged in the manner as stated, strain is relieved thereon. The device is so constructed and arranged that the head, carrier or base can be conveniently cleaned when required, and further owing to the manner of setting up the head and carrier with respect to the support, the head can be removed at any time and new bags, which constitute the cloth strainers, can be replaced when desired.

It is thought that the many advantages of a filtering device, in accordance with this invention, can be readily understood, and although the preferred embodiment of the invention is as illustrated and described, yet it is to be understood that changes in the details of construction can be had which will fall within the scope of the invention as claimed.

What I claim is:—

1. A filtering device comprising a support, a base element secured thereto and provided with water straining means and a discharge spout, a carrier detachably connected with said support, overlapping and opening into the base and provided with a pair of strainer elements having a filtering agent interposed therebetween, and a head detachably connected to said support, closing the top of said carrier and provided with an inlet, a strainer element intermediate its ends and a plurality of strainer elements depending from its bottom and resting on one of the strainer elements within the carrier.

2. A filtering device comprising a support, a base element secured thereto and provided with water straining means and a discharge spout, a carrier detachably connected with said support, overlapping and opening into the base and provided with a pair of strainer elements having a filtering agent interposed therebetween, and a head detachably connected to said support, closing the top of said carrier and provided with an inlet, a strainer element intermediate its ends and a plurality of strainer elements depending from its bottom and resting on one of the strainer elements within the carrier, the strainer element positioned intermediate the ends of said head being pyramidal in contour and spaced from said inlet.

3. A filtering device comprising a support, a base element secured thereto and provided with water straining means and a discharge spout, a carrier detachably connected with said support, overlapping and opening into the base and provided with a pair of strainer elements having a filtering agent interposed therebetween, and a head detachably connected to said support, closing the top of said carrier and provided with an inlet, a strainer element intermediate its ends and a plurality of strainer elements depending from its bottom and resting on one of the strainer elements within the carrier, said head open at its front and sides.

4. A filtering device comprising a support, a base element secured thereto and provided with water straining means and a discharge spout, a carrier detachably connected with said support, overlapping and opening into the base and provided with a pair of strainer elements having a filtering agent interposed therebetween, and a head detachably connected to said support, closing the top of said carrier and provided with an inlet, a strainer element intermediate its ends and a plurality of strainer elements depending from its bottom and resting on one of the strainer elements within the carrier, the strainer element positioned intermediate the ends of said head being pyramidal in contour and spaced from said inlet, said head open at its front and sides.

5. A filtering device comprising a base of pan-like contour formed with a discharge spout and provided therein with water straining means, a carrier detachably mounted on the top of the base, communicating therewith and provided therein with a pair of strainer elements having interposed therebetween a filtering agent, and a head detachably mounted on the carrier for closing the same and provided intermediate its ends with a pyramidal strainer element and further having depending from its bottom a pair of strainer elements seating on one of the strainer elements in said carrier, said head further provided at its top with a water inlet spout.

6. A filtering device comprising a base of pan-like contour formed with a discharge spout and provided therein with water straining means, a carrier detachably mounted on the top of the base, communicating therewith and provided therein with a pair of strainer elements having interposed therebetween a filtering agent, and a head detachably mounted on the carrier for closing the same and provided intermediate its ends with a pyramidal strainer element and further having depending from its bottom a pair of strainer elements seating on one of the strainer elements in said carrier, said head further provided at its top with a water inlet spout, and said head open at its front and sides.

7. A filtering device comprising a base of pan-like construction provided with a discharge spout, a carrier detachably mounted on said base and provided with a water conducting member discharging into the base, a lower strainer element within the carrier and extending across said conducting member, a filtering agent mounted on said strainer, an upper strainer element mounted on said filtering agent, a head detachably mounted on and closing the top of the carrier and provided with a pair of flexible strainer elements seating on said upper strainer element, said head further including a pyramidal strainer element positioned above and spaced from said flexible strainer elements and an inlet spout spaced from said strainer element.

8. A filtering device comprising a base of pan-like construction provided with a discharge spout, a carrier detachably mounted on said base and provided with a water conducting member discharging into the base, a lower strainer element within the carrier and extending across said conducting member, a filtering agent mounted on said strainer, an upper strainer element mounted on said filtering agent, a head detachably mounted on and closing the top of the carrier and provided with a pair of flexible strainer elements seating on said upper strainer element, said head further including a pyramidal strainer element positioned above and spaced from said flexible strainer elements and an inlet spout spaced from said strainer element, and said head open at its front and sides.

In testimony whereof, I affix my signature hereto.

WILLIAM H. BERNTSEN.